United States Patent [19]

Dinitz et al.

[11] Patent Number: 4,528,786

[45] Date of Patent: Jul. 16, 1985

[54] LOW PROFILE BREAK SAFE BREAKAWAY SYSTEM

[75] Inventors: Arthur M. Dinitz, Westport, Conn.; Patrick A. Pappano, New Rochelle, N.Y.

[73] Assignee: Transpo Industries, New Rochelle, N.Y.

[21] Appl. No.: 428,700

[22] Filed: Sep. 30, 1982

[51] Int. Cl.³ .......................... E04B 1/00; F16D 9/00
[52] U.S. Cl. ........................................ 52/98; 52/296; 52/704; 403/2
[58] Field of Search .............. 52/98, 99, 100, 105, 52/106, 107, 296, 704–707; 248/548, 549, 188.7, 158, 525, 529; 404/10; 40/612, 607, 608, 606; 403/2

[56] References Cited

U.S. PATENT DOCUMENTS

| | | | |
|---|---|---|---|
| 1,281,416 | 10/1918 | Pratt | 52/707 |
| 3,236,019 | 2/1966 | Ballou | 52/705 |
| 3,521,413 | 7/1970 | Scott et al. | 52/98 |
| 3,630,474 | 12/1971 | Minor | 52/98 |
| 3,856,242 | 12/1974 | Cook | 248/548 |
| 3,951,566 | 4/1976 | Strizki | 52/98 |
| 3,967,906 | 7/1976 | Strizki | 52/98 |
| 4,007,564 | 2/1977 | Chisholm | 52/98 |
| 4,032,098 | 6/1977 | Marschak | 248/88.7 |
| 4,084,362 | 4/1978 | Piazza | 52/705 |
| 4,095,381 | 6/1978 | Garchinsky | 52/98 |

*Primary Examiner*—John E. Murtagh
*Assistant Examiner*—Andrew Joseph Rudy
*Attorney, Agent, or Firm*—Lilling & Greenspan

[57] ABSTRACT

A low profile break safe breakaway system is described for mounting a post or the like in a vertical position on a footing. The system includes load concentrating elements on brackets disposed on opposite sides of the post to be supported. Breakaway members are provided which cooperate with the load concentrating elements and which are threadedly inserted into anchors which are embedded in the footing. The anchors include steel bar loops which extend downwardly into the footing and internally threaded elements at the upper ends of the anchors. Annular collars are provided at the upper ends of the anchor internally threaded members at the surface of the footing to prevent shattering of the footing concrete on application of bending moments of the coupling members.

12 Claims, 4 Drawing Figures

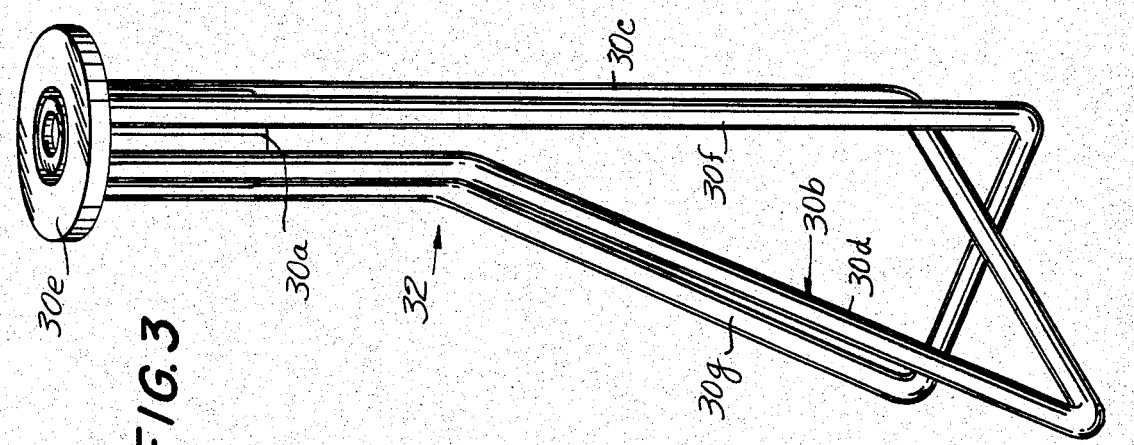
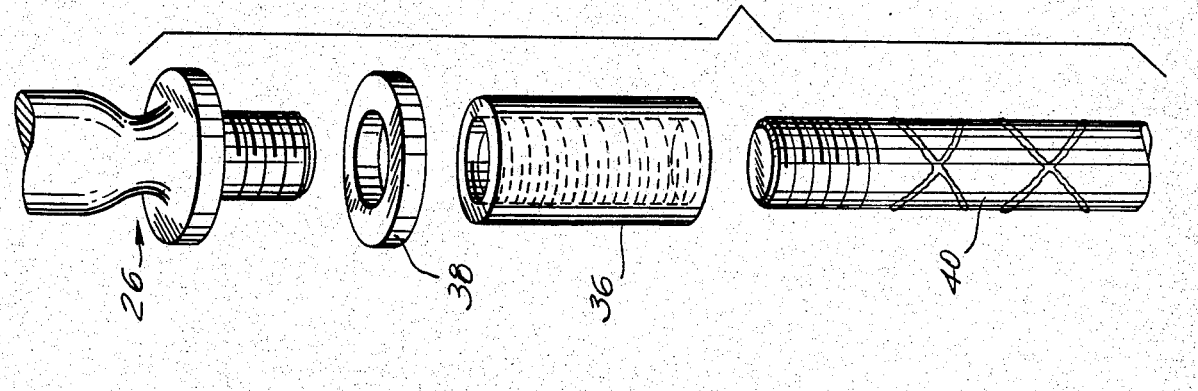
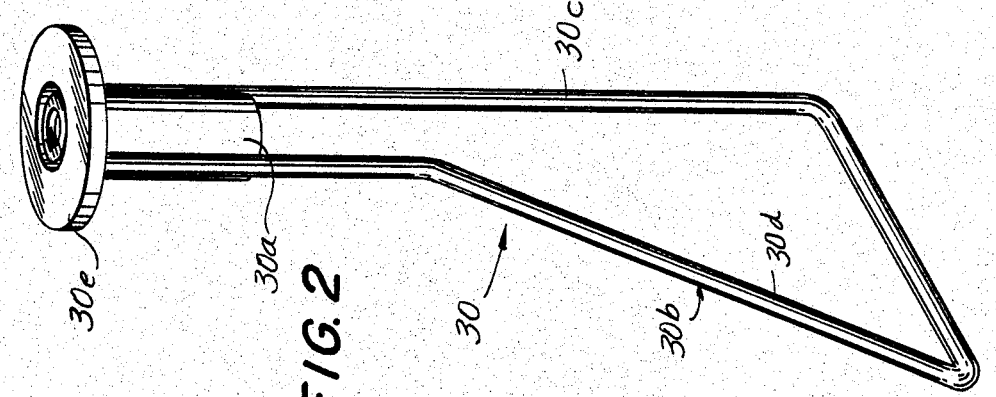

LOW PROFILE BREAK SAFE BREAKAWAY SYSTEM

BACKGROUND OF THE INVENTION

The invention generally relates to safety ground support systems for highway signs, utility poles and the like, and more specifically to a load profile break safe breakaway system.

U.S. Pat. No. 3,951,556, owned by the Assignee of the subject application, discloses a load concentrated breakaway coupling apparatus. The aforementioned patent contains a discussion of the background of such highway post supporting devices and the problems which need be overcome. While the breakaway coupling assemblies disclosed in the patent under discussion have proved extremely satisfactory and have met safety standards established by various governmental transportation agencies, there has recently been a trend for consumers to purchase and drive smaller automobiles. The so-called compact and sub-compact automobiles are generally positioned lower or closer to the ground as compared with the larger and medium sized cars causing higher incidences of snagging.

In the above mentioned U.S. Pat. No. 3,951,556, the mathematical relationships are discussed which make it possible for the breakaway system to balance the clockwise and counter-clockwise torques at the breakaway assemblies caused by wind loads, while producing bending moments which sever the breakaway couplings upon impact forces applied proximate to the breakaway couplings. It has been found that it is desirable to lower the breakaway couplings as low as possible to the footings on which the posts are mounted to accommodate the smaller compact and sub-compact automobiles.

In accordance with one system which has been proposed to lower the heights of the breakaway couplings, there are provided a plurality of bolts the major portions of which are embedded in the footing concrete, the upwardly projecting exposed ends being externally threaded. The couplings are provided, at their lower portions thereof, with internally threaded openings which are adapted to threadedly mesh onto the upwardly extending footing bolts. This proposed system has a number of disadvantages. For example, when sufficiently high bending moments are applied to the exposed footing bolt portions, these bend and are rendered essentially unusable. To replace the footing bolts, it is practically necessary to destroy the footing in order to extract the embedded portions of the bolt.

A post mounting system, similar to the system just described, is sometimes referred to as the "New Jersey System". This system is similar to that just described with the exception that the lower portions of the breakaway couplings, those threadedly meshed with the anchor bolt projecting portions, are embedded within a layer of grout. Clearly, while the use of the grout is an attempt to raise the level of the footing to the finished ground line, the addition of the grout in a way which covers the portions of the couplings below the necked down portion or the zone of weakness complicates replacement of the post on new couplings following impact.

SUMMARY OF THE INVENTION

Accordingly, it is an object of the present invention to overcome the disadvantages and limitations inherent in the low profile break safe breakaway systems hitherto proposed and used.

It is another object of the present invention to provide a low profile break safe breakaway system which is simple in construction and economical to manufacture.

It is still another object of the present invention to provide a system of the type aforementioned which accommodates automobiles having low impact lines of force.

It is yet another object of the present invention to provide a system of the type under discussion which can be quickly serviced and installed.

It is a further object of the present invention to provide a low profile break safe breakaway system which eliminates cracking or shattering of concrete footings as a result of bending moments on the breakaway couplings and the embedded mounting means for supporting the couplings.

In order to achieve the above objects, as well as others which will become apparent hereafter, a low profile break safe breakaway system in accordance with the present invention for mounting the post or the like in a vertical position on a footing comprises brackets on opposite sides of the post adapted to be secured to the post near the lower end thereof. Each bracket has an outwardly extending flange which defines upwardly and downwardly facing surfaces. The flanges are provided with a plurality of openings therein each spaced a predetermined distance from the vertical axis of the post. A plurality of breakaway coupling members are provided each having threaded portions at opposite ends thereof and having a zone of weakness between said threaded portions. At least the downwardly extending ends of the coupling members are externally threaded. The coupling members are connected to the outwardly extending flanges at the openings. A plurality of anchors are provided which are embedded in the footing and arranged to be aligned with the openings in the coupling members when the post is mounted in a vertical direction. Each anchor has an internally threaded member extending into the footing substantially from the upper surface thereof and adapted to receive the externally threaded downwardly extending ends of said coupling members. Load concentrating means are provided cooperating with the flanges and the coupling members to normally cause breakage of the coupling members at the zones of weakness only upon application of a laterally directed force to the post proximate to the brackets. In this manner, the system is effective with low impacting forces substantially in the region just above the coupling members.

In accordance with an important feature of the present invention, each anchor is further provided with an annular collar in the nature of a flat washer provided at the end of the anchor internally threaded members which are at the surface of the footing. The annular collars abut against the footing upper surface to prevent shattering of the footing concrete on application of bending moments on the coupling members.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings in which:

FIG. 2 is a perspective view of an anchor of the type that can be used in the system shown in FIG. 1;

FIG. 3 shows a modified anchor which can be used in lieu of the anchor shown in FIG. 2; and FIG. 4 is an exploded view of still another modified anchor that can be used with the system shown in FIG. 1.

DESCRIPTION OF THE PREFERRED EMBODIMENTS

Figure 1:
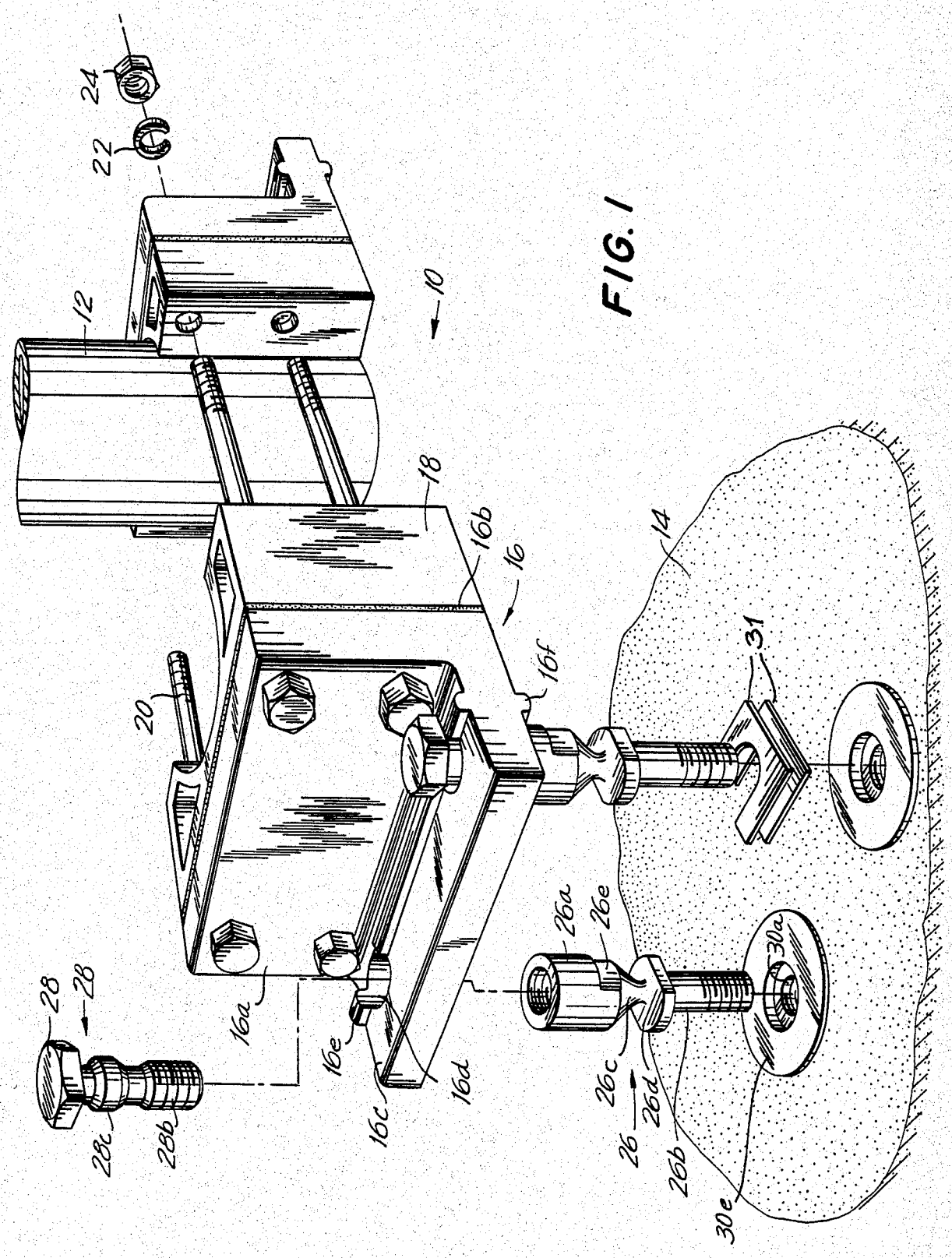
FIG. 1 is an exploded view, in perspective, showing the manner in which the low profile of break safe breakaway system in accordance with the present invention connects the lower end of a post or the like in a vertical direction on a footing.

Referring now to the drawings, in which the identical or similar parts are designated by the same reference numerals throughout, and first referring to FIG. 1, a low profile break safe breakaway system in accordance with the present invention is generally designated by the reference numeral 10.

The system 10 is intended to mount a post or the like 12 in a vertical position on a footing 14. The footing 14 is typically formed of concrete or the like and prepared according to well established principles.

The system 10 includes brackets 16 on opposite sides of the post 12 adapted to be secured to the post 12 near the lower end thereof. Each bracket 16 has an upwardly extending flange 16a which may be provided with appropriate gripping surfaces 16b such as a toothed surface, for reasons which are believed to be evident and discussed in U.S. Pat. No. 3,951,556.

The brackets 16 are also provided with outwardly extending flanges 16c which define upwardly and downwardly facing surfaces. The flanges 16c are provided with a plurality of openings 16d spaced predtermined distances from the vertical axis of the post.

In the embodiment being described, the post is in the nature of a round steel pipe 12. In order to accommodate such pipe, there is provided a suitable adapter 18 each half of which is provided with a cylindrical surface as shown to mate with and abut against the external cylindrical surface of the pipe 12. A plurality of bolts 20 are provided which extend through holes in both the flanges 16a and in the adapters 18. Lock washers 22 and nuts 24 are used in connection with each bolt 20 to tighten the adapters 18 around the post 12 to secure the post 12 and prevent relative movement between the post and the adapters 18 and, therefore, the brackets 16.

A plurality of breakaway coupling members 26 are provided, four such coupling members 26 in the embodiment shown. Each coupling member has threaded portions 26a and 26b at opposite ends thereof and has a zone of weakness 26c between the threaded portions or ends. An important feature of the present invention is that at least the downwardly extending end 26b of each coupling member 26 is externally threaded. The coupling members are connected to the outwardly flanges 16c at the openings 16d as shown.

In the embodiment being described, the upper threaded portion or end 26a is internally threaded, while the lower threaded portion or end is externally threaded, as noted.

Upper and lower load concentrating elements 16e and 16f are disposed on the flanges 16c as shown which cooperate with the coupling members to normally cause breakage of the coupling members at the zones of weakness or necked down portions 26c only upon application of a laterally directed force to the post 12 proximate to the brackets 16. A full description of the theory of operation of the load concentrating elements 16e and 16f is provided in U.S. Pat. No. 3,951,556 and the discussion which describes the load concentrating elements is hereby incorporated as if fully set forth herein.

The brackets 16 and, therefore, the post 12, are secured to the coupling members 26 by means of special bolts 28 which include a head portion 28a and a threaded portion 28b which is adapted to be internally received and threadedly meshed with the coupling member upper portion 26a. The bolt 28 is provided with a round smooth intermediate enlarged portion 28c which, when the system is assembled is disposed within the opening 16d interior of the flange 16c. This arrangement secures the brackets 16c to the coupling members 26 without freezing the bolts 28 interiorly of the flanges 16c to thereby avoid interference with the desired compensating effects provided by the load concentrating elements 16e and 16f.

Another important feature of the present invention is the provision of a plurality of anchors, 30, four in the embodiment being described (FIGS. 1 and 2). Each of the anchors is embedded in the footing 14 and arranged to be aligned with the openings 16b and the coupling members 26 when the post 12 is mounted in the vertical direction as shown. Each anchor 30 has an internally threaded member 30a which extends into the footing 14 substantially from the upper surface as shown. The internally threaded members 30a are adapted to receive the externally threaded downwardly extending ends 26b of the coupling members 26.

Referring to FIG. 1, the coupling members 26 are provided with an annular projection in the nature of a stop element 26d intermediate to the lower threaded portion 26b and the necked down portion or zone of weakness 26c as shown. The coupling members 26 are intended to be threadedly meshed into the anchors 30 until the stop portions 26d abut against the anchors 30. In this connection, there may be advantageously provided means for adjusting the degree of penetration of the threaded portions 26b into the anchor internally threaded members 30a to thereby assure horizontal alignment of the coupling members 26 and vertical positioning of the post 12. One method presently contemplated for providing such adjustment is the use of shims 31 which are provided between selective ones of the coupling members 26 and their associated anchors 30.

Referring to FIG. 2, the anchors 30 are shown to include at least one rigid loop which is downwardly extending from the internally threaded member 30a. The rigid loop 30b may be made of iron bar or any other suitable material. The loops 30b are shown asymmetrically formed and include a downwardly extending portion 30c and a portion 30d which deflects, at least partially, with respect to the axis of the associated threaded member 30a. This asymmetrical arrangement is advantageously used to minimize footing size while optimizing the stresses which the anchor 30 may sustain.

Referring to FIG. 3, a modified anchor 32 is shown which includes two rigid loops downwardly extending from the internally threaded member 30a. One loop, including downwardly extending leg portions 30b and 30c, and the other loop including downwardly extending leg portions 30f and 30g, are disposed in planes normal to each other as shown. This arrangement, clearly, increases the tensile stresses which the anchor can sustain. As with the anchors shown in FIG. 2, the double looped anchors shown in FIG. 3 may also be asymmetrically formed as shown. The approximate ultimate capacities achievable with anchors of the type shown as a function of the length and configuration of the loops are given in trade catalogues.

FIG. 4 illustrates still another embodiment of an anchor which can be used with the system in accordance with the present invention. The anchor 34 includes a separate internally threaded open ferrule 36 and a washer 38 which is clamped by the action of inserting the coupling 26 into the ferrule 36. The ferrule 36, in turn, is threaded onto a threaded reinforcing bar 40. The specific configuration of the anchor bar used, however, is not critical and any conventional or standard anchoring elements of sufficient strength which are suitably threaded may be used.

A further important feature of the present invention is the use of an annular collar 30e or a flat washer 38 provided at the end of the internally threaded members 30a which are at the surface of the footing 14. The collar 30e or washer 38 abut against the footing surface to prevent shattering of the footing concrete on application of bending moments on the coupling members 26. Advantageously, the annular collars or flat washers 30e,38 are integrally formed with the internally threaded members 30a or are securely fastened thereto such as by bolting (FIG. 4) or welding.

While the upper threaded portion or end of each coupling 26 may be internally or externally threaded, the embodiment being described illustrates coupling members which are externally threaded at the lower ends thereof and internally threaded at the upper ends thereof. With coupling members of the type shown, there is provided special bolts 28 which extend through the openings 16d as aforesaid and are received within the internally threaded ends 26a of the coupling members 26. Advantageously, the internally threaded portions or ends 26a are provided with opposed flattened surfaces 26e which facilitate gripping by a wrench or the like when assembling the structure and threadedly meshing the coupling members 26 into the anchors 30.

While a particular embodiment of the invention has been shown in the drawings and described above, it will be apparent that many changes may be made in the form, arrangement and positioning of the various elements of the combination. For example, the low profile construction in accordance with the invention has been disclosed in conjunction with a system for supporting a round tubing or post. It will be evident to those skilled in the art, however, that the same or slightly modified system may also be used in conjunction with other posts, such as WF and standard sections, square tubes and back-to-back U-channel sections. In consideration thereof, it should be understood that the preferred embodiments of this invention disclosed herein are intended to be illustrative only and not intended to limit the scope of the invention.

What is claimed is:

1. A low profile break safe breakaway system for mounting a post or the like in a vertical position on a footing comprising brackets on opposite sides of the post adapted to be secured to the post near the lower end thereof and each bracket having an outwardly extending flange defining upwardly and downwardly facing surfaces, said flanges being provided with a plurality of openings therein each spaced a predetermined distance from the vertical axis of the post; a plurality of breakaway coupling members having threaded portions at opposite ends thereof and having a zone of weakness between said threaded portions, at least the downwardly extending ends of said coupling members being externally threaded, said coupling members being connected to said outwardly extending flanges at said openings; a plurality of anchors embedded in the footing and arranged to be aligned with said openings and said coupling members when the post is mounted in a vertical direction, each anchor having an internally threaded member extending into the footing substantially from the upper surface thereof and adapted to receive the externally threaded downwardly extending ends of said coupling members; and load concentrating means cooperating with said flanges and said coupling members to normally cause breakage of said coupling members at said zones of weakness only upon application of a laterally directed force to the post proximate to said brackets, whereby the system is effective with low impacting forces substantially in the region just above said coupling members.

2. A system as defined in claim 1, wherein each coupling member is externally threaded at the lower end thereof and internally threaded at the upper end thereof.

3. A system as defined in claim 2, further comprising bolts extending through said openings and being received within said internally threaded ends of said coupling member.

4. A system as defined in claim 1, further comprising means for adjusting the degree of penetration of said coupling members downwardly extending ends into said anchor internally threaded members to thereby assure horizontal alignment of said coupling members and vertical positioning of the post.

5. A system as defined in claim 4, wherein said adjusting means comprises shims provided between selective ones of said coupling members and their associated anchors.

6. A system as defined in claim 1, wherein each anchor is further provided with an annular collar in the nature of a flat washer provided at the ends of said anchor internally threaded members which are at the surface of the footing, said annular collars abutting against the footing surface to prevent shattering of the footing concrete on application of bending moments on said coupling members.

7. A system as defined in claim 6, wherein said annular collars are integrally formed with said anchor internally threaded members.

8. A system as defined in claim 6, wherein each flat washer is clamped between an associated internally threaded member and an associated coupling member.

9. A system as defined in claim 1, wherein each of said anchors includes at least one rigid loop downwardly extending from said internally threaded member.

10. A system as defined in claim 9, wherein said rigid loop is made of iron bar.

11. A system as defined in claim 9, wherein said loops are asymmetrically formed with respect to the axis of an associated internally threaded member to minimize footing size.

12. A system as defined in claim 9, wherein each anchor includes two rigid loops downwardly extending from said internally threaded member, each two cooperating rigid loops being disposed in planes normal to each other.

* * * * *